US008590027B2

United States Patent
Rowley (10) Patent No.: US 8,590,027 B2
(45) Date of Patent: Nov. 19, 2013

(54) SECURE AUTHENTICATION IN BROWSER REDIRECTION AUTHENTICATION SCHEMES

(75) Inventor: Peter Andrew Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 1263 days.

(21) Appl. No.: 11/702,773

(22) Filed: Feb. 5, 2007

(65) Prior Publication Data

US 2008/0189778 A1    Aug. 7, 2008

(51) Int. Cl.
*H04L 29/00* (2006.01)

(52) U.S. Cl.
USPC ............... 726/9; 726/6; 380/262; 380/273

(58) Field of Classification Search
None
See application file for complete search history.

(56) References Cited

U.S. PATENT DOCUMENTS

| 7,548,620 B2* | 6/2009 | Popp ........................... 380/273 |
| 2003/0172090 A1* | 9/2003 | Asunmaa et al. ............. 707/200 |
| 2006/0053296 A1* | 3/2006 | Busboom et al. ............. 713/182 |
| 2006/0235761 A1* | 10/2006 | Johnson ........................ 705/26 |
| 2007/0143829 A1* | 6/2007 | Hinton et al. ..................... 726/5 |
| 2007/0204325 A1* | 8/2007 | Cameron et al. ................... 726/1 |
| 2007/0289004 A1* | 12/2007 | Chao et al. ....................... 726/9 |
| 2008/0168544 A1* | 7/2008 | von Krogh ........................ 726/6 |
| 2008/0184339 A1* | 7/2008 | Shewchuk et al. ................. 726/3 |

* cited by examiner

*Primary Examiner* — Jeffrey Pwu
*Assistant Examiner* — Michael D Anderson
(74) *Attorney, Agent, or Firm* — Lowenstein Sandler LLP (57) ABSTRACT

A method and apparatus for authenticating a client is described. In one embodiment, an identity provider server authenticates the client that is redirected from a relying party server. The identity provider server authenticates the client without receiving a replayable credential from the client. Upon authentication of the client, the identity provider server transmits a token of authentication to the client.

21 Claims, 8 Drawing Sheets

FIG. 8

SECURE AUTHENTICATION IN BROWSER REDIRECTION AUTHENTICATION SCHEMES

TECHNICAL FIELD

Embodiments of the present invention relate to computer networks, and more specifically to authenticating users of a redirected web browser.

BACKGROUND

When executing applications on a computer, an application often requires users to authenticate themselves prior to performing any actions to prevent unauthorized access. For example, a user may have to provide identification with a user name and password, a serial number for the software being installed, a personal identification number (PIN). Further, depending on where the client/user is located, different authentication may be required. For example, if a user is logging onto a network at the user's office, a username and password may be required. But if the user is logging onto the user's office's network from home, an additional username and password may be required (or a different mechanism may be required).

One solution involves a single sign on scheme allowing a user to authenticate once and gain access to the resources of multiple computing systems. A user attempting to log in a relying party (RP) server is redirected to an identity provider (IDP) server for authentication. However, such single sign on scheme is vulnerable to "man in the middle" attacks due to each web site visited being in control of the redirection. For example, a website may redirect to itself or a malicious party and proxy the conversation between the user-agent and the IDP server. Username and password schemes and other forms of authentication that provide the raw credentials on the wire are vulnerable to having those credentials appropriated by malicious sites.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for authenticating a redirected client. A client attempting to log on a relying party (RP) server using a single sign on scheme is redirected to an identity provider (IDP) server. The client is already signed up with the IDP server. The IDP authenticates the client without receiving any raw or replayable credentials from the client. The client forwards a token of authentication to the RP server upon successful authentication.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
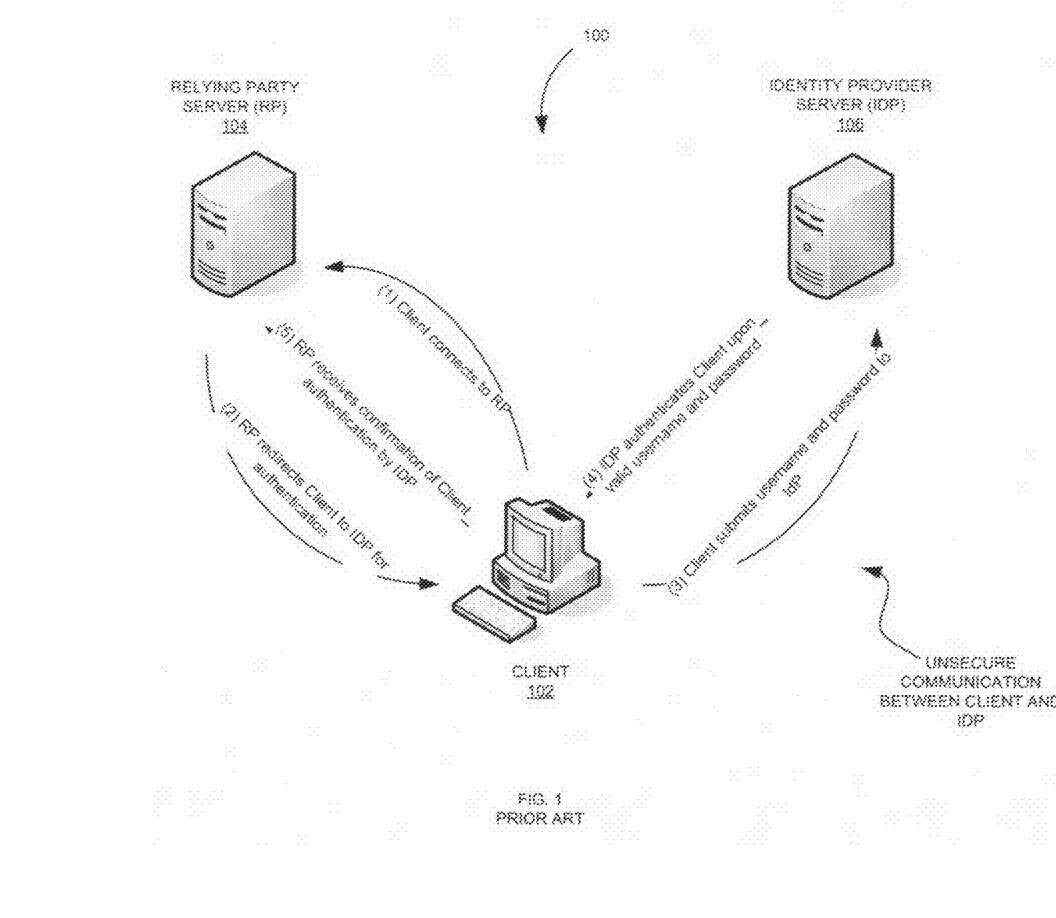
FIG. 1 illustrates a redirection authentication method in accordance with a prior art.

FIG. 1 illustrates a conventional redirection authentication system 100. At (1) a user at client 102 enters the URL of the RP server 104. At (2), the RP server 104 redirects the web browser of client 102 to IDP server 106. At (3), client 102 is authenticated using a username/password authentication scheme, or a challenge-response authentication schema. Regardless of which scheme, client 102 sends raw data information to IDP server 106 for authentication. At (4), IDP server 106 authenticates client 102 upon valid credentials. At (5), the web browser of client 102 is redirected to RP server 104. Client 102 is now logged in the RP server 104 upon successful authentication with IDP server 106.

The username/password authentication schema requires a user to enter a username and password to authenticate himself/herself. Thus, when a user/client requests access to data or attempts to execute an application on IDP server 106, IDP server 106 requests that the user enter a username and a password that has previously been assigned to/selected by the user. Once the correct username and corresponding password has been entered by the user, IDP server 106 allows the user to access the desired information or executes the desired application.

The challenge-response authentication schema requires the requesting user to provide the server with information in response to a request by the IDP server. For example, in one type of challenge-response schema, when a user requests execution of an application or access to data, the IDP server requests the username. Once the user provides the username, the server provides a challenge or a question to the user that can only be responded to/answered by utilizing information that has been previously provided to the user. For example, the user may be provided a book and the IDP server may ask a trivia question on information that can be found in the book. Alternatively, a number log may be provided to the user and in response to one number, the user must look up a corresponding number and provide it back to the server. Alternatively, the user may be provided with a calculator preprogrammed to perform a given calculation when a number is entered. With such a calculator, the IDP server provides a number or word to the user, the user enters the number or word in the calculator, and the calculator provides a response for the user to transmit back to the server. In this manner, the server "challenges" the user, and the user provides a "response".

In some challenge-response schema, each time a user requests access to information or requests execution of an application, the challenge provided by the IDP server to the user is different, thereby resulting in a different response. Thus, even if a response is intercepted by a hacker, the intercepted response will not work when the hacker attempts to access information or execute an application on the server.

Figure 2:
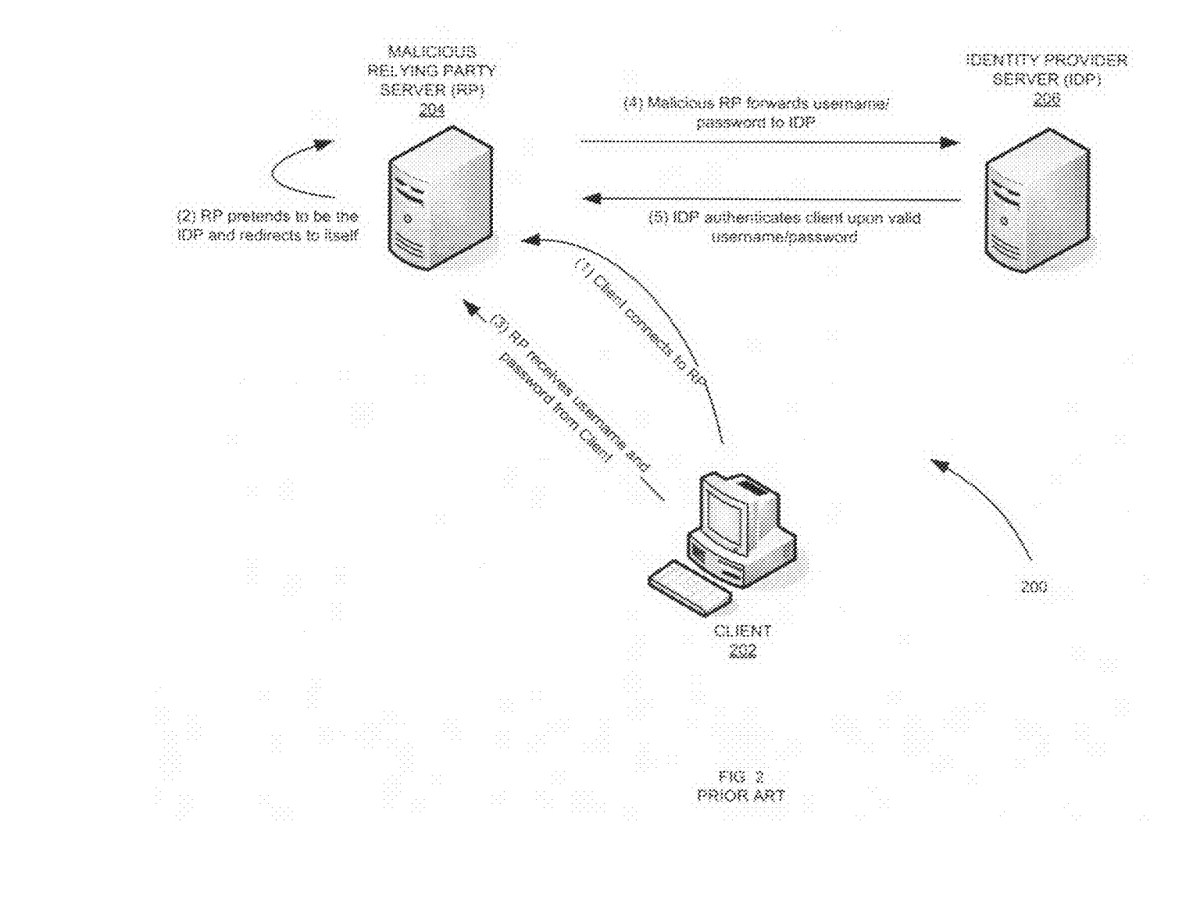
FIG. 2 illustrates a malicious relying party server redirecting to itself in the redirection authentication method of FIG. 1.

FIG. 2 illustrates a conventional redirection authentication system 200. At (1) a user at client 202 enters the URL of the RP server 204. At (2), the RP server 204 redirects the web browser of client 202 to itself, RP server 204 and pretends to be the IDP server 206. At (3), client 202 submits raw data to the RP server 204. The raw data may include a username/password authentication scheme, or a challenge-response authentication schema. At (4), RP server 204 acts as an agent for client 202 and sends the raw data information to IDP server 206 for authentication. At (5), IDP server 206 authenticates client 202 upon valid credentials. Client 102 is now logged in the RP server 204 upon successful authentication with IDP server 206. RP server 204 also has obtained the confidential information that was intended only for IDP server 206 from client 202.

Figure 3:
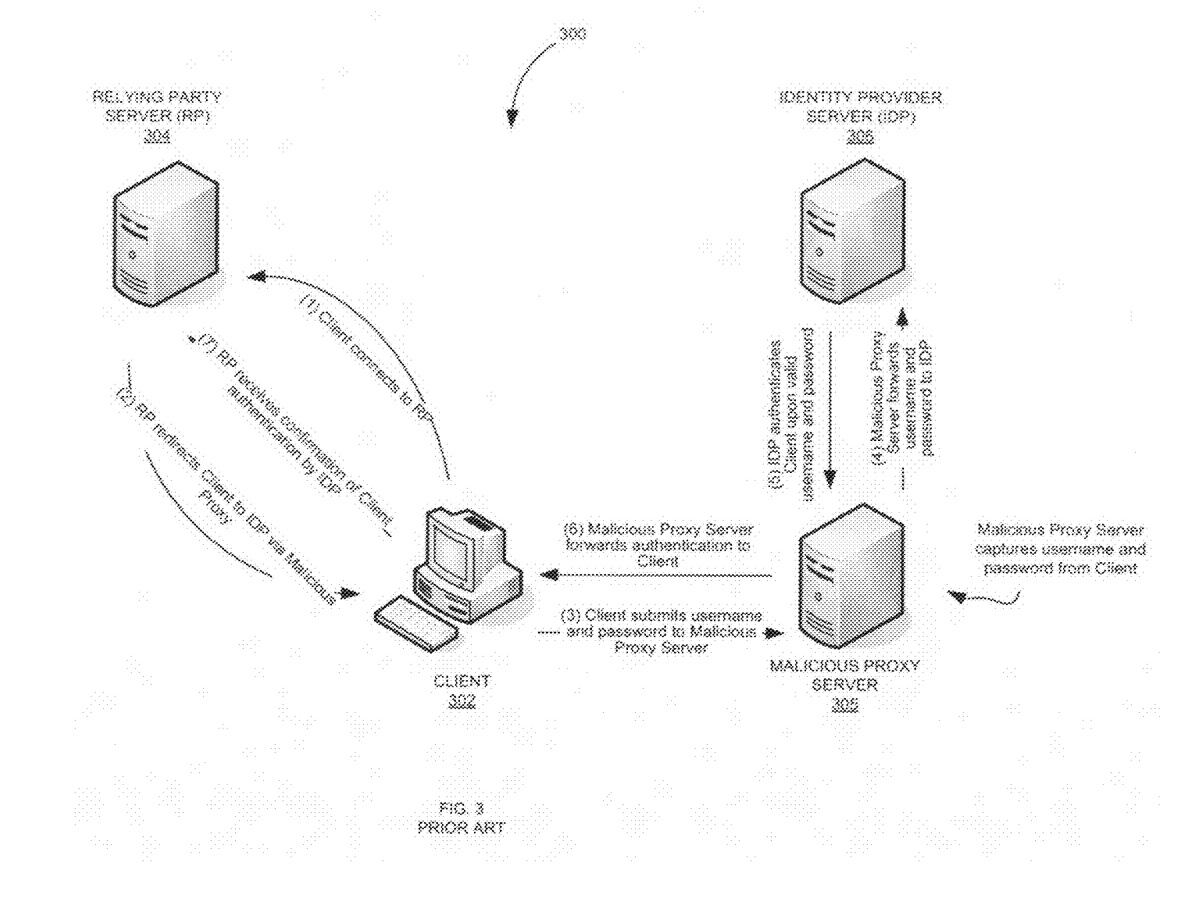
FIG. 3 illustrates a relying party server redirecting to a malicious proxy server in the redirection authentication method of FIG. 1.

FIG. 3 illustrates a conventional redirection authentication system 200. At (1) a user at client 302 enters the URL of the RP server 304. At (2), RP server 304 redirects the web browser of client 302 to a malicious proxy server 305 which pretends to be the IDP server 306. At (3), client 302 submits raw data to malicious server 305. The raw data may include a username/password authentication scheme, or a challenge-response authentication schema. At (4), malicious server 305 acts as an agent for client 302 and sends the raw data information to IDP server 306 for authentication. At (5), IDP server 306 authenticates client 302 upon valid credentials. At (6), malicious proxy server 305 forwards the authentication token to client 302. At (7), client 302 is now logged in with RP server 304. Malicious proxy server 305 has obtained the confidential information that was intended only for IDP server 306 from client 302.

Figure 4:
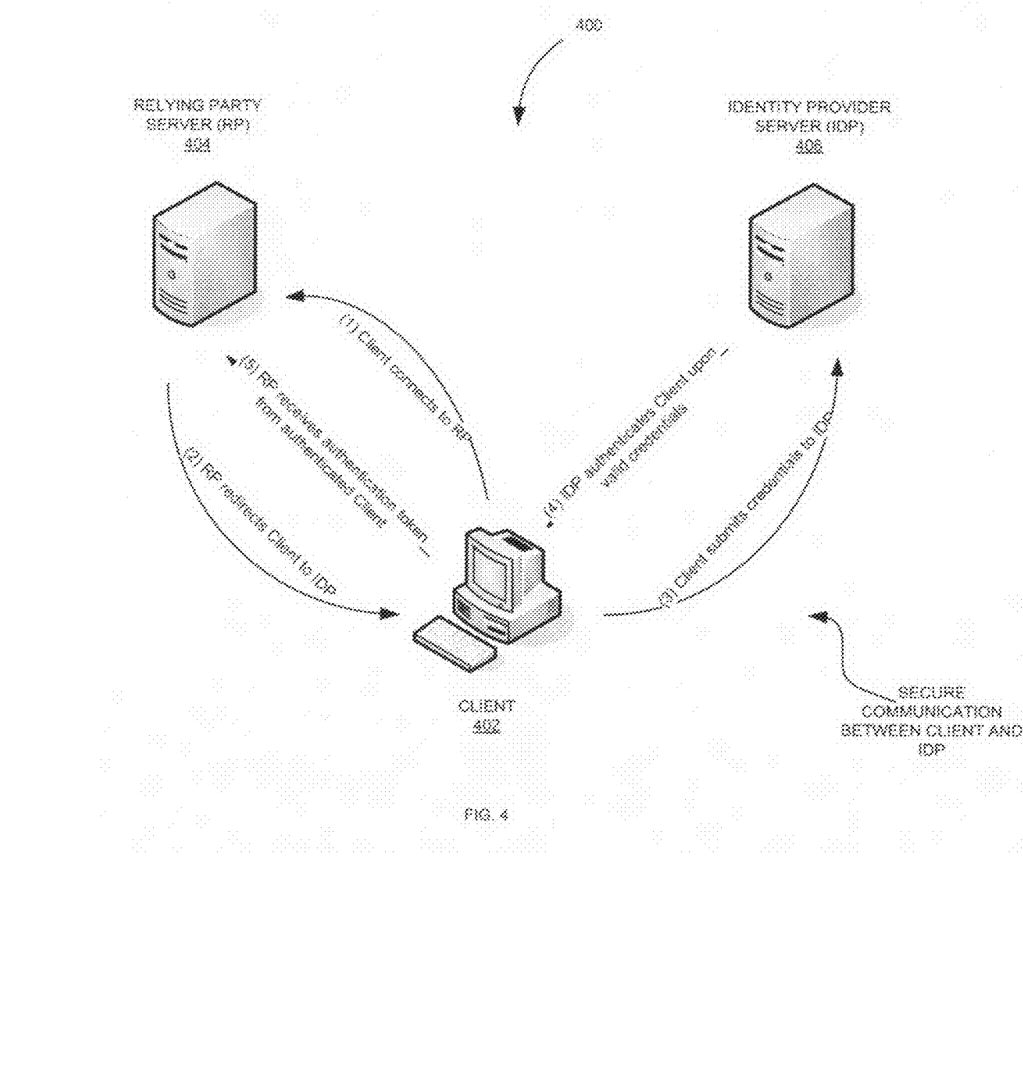
FIG. 4 illustrates a redirection authentication method in accordance with one embodiment.

FIG. 4 illustrates an exemplary network architecture 400 in which embodiments of the present invention may operate. The network architecture 400 may include one or more client devices (client 402, a relying party (RP) server 404, an identity provider (IDP) server 406 and a network. The network, which may be a public network (e.g., Internet) or a private network (e.g., Ethernet or a local area Network (LAN)) may allow the client 402, RP server 404, and IDP server 406 to communicate with each other.

In accordance with one embodiment, the network architecture 400 may include a single sign on scheme where a user may be able to login in one or more websites with the same identity. Once the user creates an identity at the IDP server 406, that same identity established at the IDP server 406 can be used to access other websites or servers.

Client 402 may be a computing device, for example, personal computers (PCs), mobile phones, palm-sized computing devices, personal digital assistants (PDAs), etc. A user may physically or remotely access client 402.

RP server 404 may be any server that may allow a user at client 402 to log in using the identity provided to a third party server, such as IDP server 406. The user may already have established its identity and other information with IDP server 406 in a separate configuration session. RP server 404 may host a website that the user at client 402 is attempting to access and log in.

The various communications between Client 402, RP server 404, and IDP server 406 are illustrated in FIG. 4. At (1), client 402 connects to RP server 404 and attempts to log in using a third party credential scheme also known as single sign on. In one embodiment, client 402 may initiate the login process by submitting the URL address of IDP server 406. At (2), RP server 404 redirects client 402 to IDP server 406. In one embodiment, RP server 404 redirects a web browser of client 402 that is used to access RP server 404. Redirection of web browser is well known to those of ordinary skills in the art and may be performed via several means. At (3), client 402 submits non-replayable credentials to IDP server 406. That is, the client 402 does not communicate raw or replayable credentials such as username/password to the IDP server 406.

It should be noted that the communication between client 402 and IDP server 406 may be secure via authentication means know to those skills in the art. For example, IDP server 406 may request user credentials from client 402. The request may include a public encryption key of IDP server 406 and an authentication certificate for IDP server 406. The use of public/private key encryption of transmitted data across the network helps to protect the transmitted data.

The public key encryption can only be decrypted with a matching private key. While IDP server 406 may freely distribute the public key, the private key is not revealed. The size of the keys may range from 512 bits to 2048 bits. The strength of the encryption depends on the encryption algorithm with the size of the encryption key.

IDP server 406 may also provide an authentication certificate when requesting user credentials. This would allow client 402 to authenticate IDP server 406. Without this level of authentication, client 402 may lack reasonable justification for releasing the user's credentials to IDP server 406. In accordance with another embodiment, IDP server 406 may have issued the authentication certificate to client 402 and may have acted as its own signing authority.

Client 402 may submit user credentials to IDP server 406. IDP server 406 may receive the authentication certificate and validate the user credentials. The authentication certificate or credentials may be protected by a public or private key encryption to prevent the threat of alteration or theft during data transmission. The public key may have been defined and exchanged during a first-time connection or configuration between client 402 and IDP server 406.

During the configuration session, the user may have been prompted for his acknowledgment to transfer public keys to the IDP server 406. Having the user consciously approve the key exchange may help reduce the chance of a malicious entity requesting user credentials from client 402 by simply making a request and providing a public key.

After exchanging public keys, the keys can be used to encrypt data that may only be decrypted by the owner of the private key. For example, client 402 may have the public key of IDP server 406. When requested to deliver user credentials, client 402 can use that public key to encrypt the user credentials and send it to any system that requests the data. Only the legitimate owner or user of client 402 will be able to decrypt the user credentials since only client 402 has the matching private key used for decryption.

IDP server 406 decrypts the response from client 402 and then validates the user credentials. The user credential may be, for example, a x.509 certificate. If IDP server 406 is unable to validate the user credentials received from client 406, access to RP server 404 may be denied.

In accordance with another embodiment, the authentication method between the IDP server 406 and client 402 may include a key pair (private and public key) with a challenge response from client 402. This, in contrast to browser certificates, involves user interaction.

In accordance with another embodiment, if IDP server 406 validates the user credentials received from client 402, IDP server 406 may check for additional levels of authentication. If there are no further levels of authentication, then access to IDP server 406 and RP server 404 is granted. As such, at (4) IDP server 406 may send an authentication token to Client 402 upon valid credentials and successful authentication.

At (5), Client 402 forwards the authentication token to RP server 404 for proof of authentication. Upon receipt of the authentication token from client 402, RP server 404 may allow the user at client 402 to access IDP server 404. In accordance with another embodiment, IDP server 406 may redirect client 402 to RP server 404 with the authentication token (as proof of authentication) and any profile data the user chooses to release.

Figure 5:
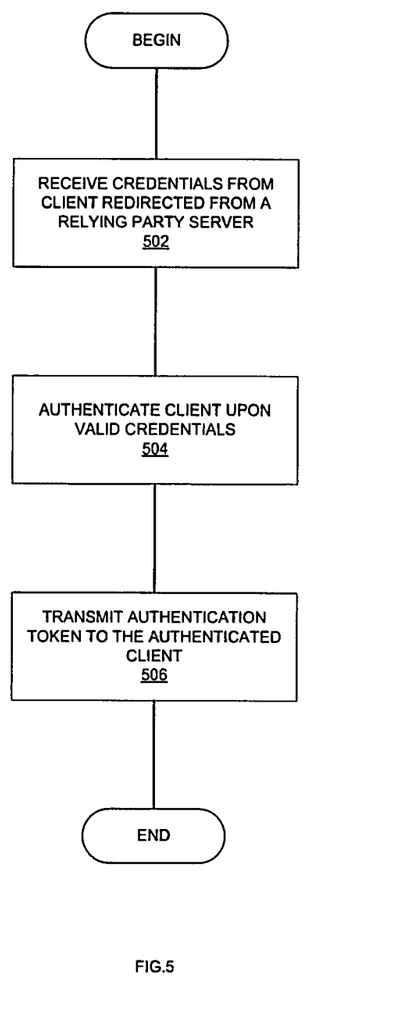
FIG. 5 illustrates a flow diagram of one embodiment of a method for an identity provider party server to authenticate a client redirected from a relying party server.

FIG. 5 illustrates a flow diagram of one embodiment of a method for an identity provider party server to authenticate a client redirected from a relying party server. At 502, the IDP server receives credentials from the redirected client. The credentials may include user certificates previously issued by the IDP server to the client. In accordance with another embodiment, the user certificate may be encrypted using public key infrastructure (PKI). At 504, upon valid credentials, the IDP server authenticates redirected client. At 506, the IDP server issues an authentication token to the client which forwards the authentication token to the RP server. In accordance with another embodiment, IDP server may redirect the client to the RP server with the authentication token (as proof of authentication) and any profile data the user chooses to release.

Figure 6:
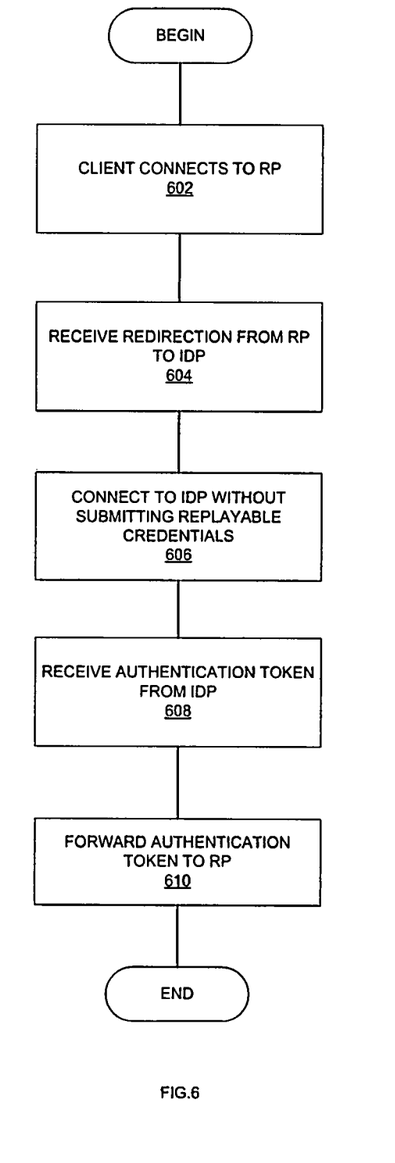
FIG. 6 illustrates a flow diagram of another embodiment of a method for a redirected client to be authenticated.

FIG. 6 illustrates a flow diagram of another embodiment of a method for a redirected client to be authenticated. At 602, a client may initiate a log in process in a relying party server using a single sign on scheme by entering for example, a URL of a third party such as an identity provider server. At 604, client is redirected to the IDP server. At 606, client logs in the IDP without submitting re-playable credentials. At 608, upon successful authentication, client receives an authentication token (as proof of valid credentials). At 610, client forwards the authentication token and is redirected to the RP server.

Figure 7:
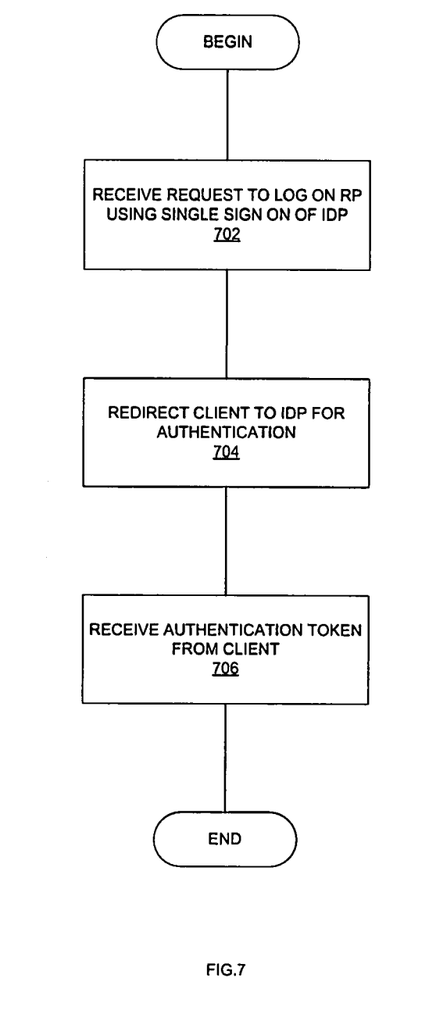
FIG. 7 illustrates a flow diagram of another embodiment of a method for a relying party to cause a redirected client to be authenticated.

FIG. 7 illustrates a flow diagram of another embodiment of a method for a relying party to cause a redirected client to be authenticated. At 702, RP server receives a request to log in along with a URL of the IDP server for a single sign on scheme. At 704, RP server redirects a web browser of the client to the IDP server 406. At 706, RP server receives an authentication token from client as proof of successful authentication with the IDP server. Client is now logged in RP server.

Figure 8:
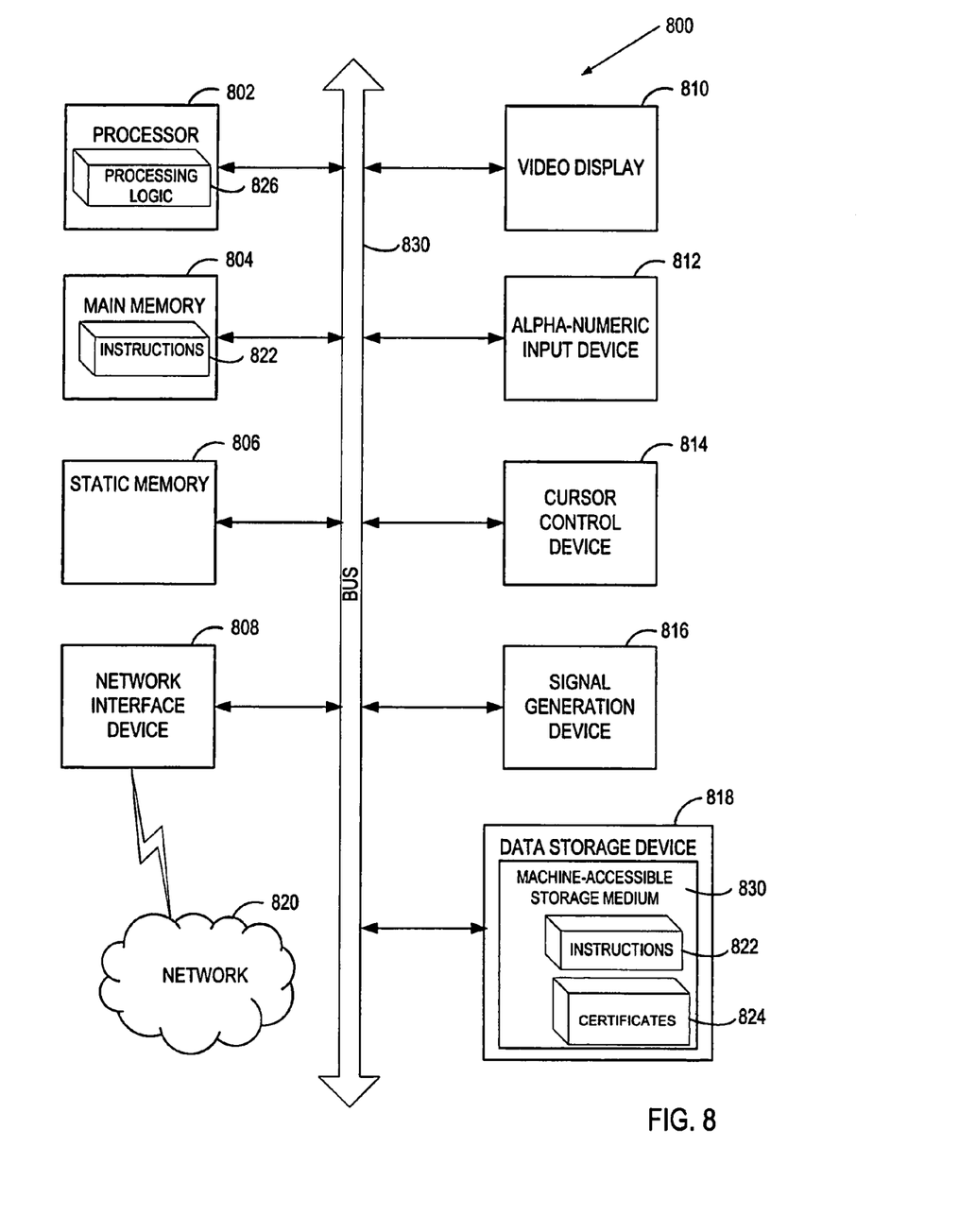
FIG. 8 illustrates a block diagram of an exemplary computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 830 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-accessible storage media. The software 822 may further be transmitted or received over a network 820 via the network interface device 808. The machine-accessible storage medium 830 may also be used to store certificates and keys 824. Certificates may be issued to clients.

While the machine-accessible storage medium 830 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for authenticating redirected clients has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for authenticating a client, the method comprising:
   issuing a digital certificate from an identity provider server of a single sign on scheme that is signed by the identity provider server to the client,
   authenticating, by the identity provider server, the client redirected from a relying party server of the single sign on scheme by:
      requesting the digital certificate issued to the client from the client;
      sending a second digital certificate by the identity provider server to the client, wherein the second digital certificate allows the client to authenticate the identity provider server;
      receiving the digital certificate from the client;
      authenticating the client using the received digital certificate;
   and
   transmitting a token of authentication to the client by the identity provider server upon authentication of the client.

2. The method of claim 1 further comprising:
   generating a key pair, prior to the authenticating the client redirected from the relying party server;
      providing a public key of the key pair to the client prior to the authenticating the client redirected from the relying party server, wherein the client encrypts the digital certificate using the public key;
      receiving the encrypted digital certificate from the client; and
      decrypting the encrypted digital certificate using a private key of the key pair.

3. The method of claim 1 wherein the relying party server receives the token of authentication from the client, and accepts the authentication of the client by the identity provider server.

4. The method of claim 1 wherein authenticating further comprises authenticating the client without receiving a password associated with a username from the client.

5. The method of claim 1 further comprising upon authenticating, receiving a profile configuration for the relying party server from the client, the profile configuration including selected user data to be communicated to the relying party server.

6. The method of claim 5 further comprising transmitting through the client selected user data to the relying party server.

7. The method of claim 1 wherein the client includes a web browser, the web browser communicating with the relying party server and the identity provider server through a network.

8. The method of claim 1 wherein the client initiates a login process with the relying party server.

9. The method of claim 8 wherein the login process includes submitting a Uniform Resource Locator (URL) of the identity provider server.

10. An apparatus comprising:
   an identity provider server of a single sign on scheme to authenticate a client redirected from a relying party server, wherein the identity provider server is authenticates the client by:
      issuing a digital certificate from the identity provider server that is signed by the identity provider server to the client;
      requesting the digital certificate issued to the client from the client;
      sending a second digital certificate by the identity provider server to the client, wherein the second digital certificate allows the client to authenticate the identity provider server;
      receiving the digital certificate from the client;
      authenticating the client using the received digital certificate;
      and transmitting a token of authentication to the client by the identity provider server upon authentication of the client.

11. The apparatus of claim 10 wherein the identity provider server further performs:
generating a key pair, prior to the identity provider server authenticating the client redirected from the relying party server;
providing a public key of the key pair to the client prior to the authenticating the client redirected from the relying party server, wherein the client encrypts the digital certificate using the public key;
receiving the encrypted digital certificate from the client; and
decrypting the encrypted digital certificate using a private key of the key pair.

12. The apparatus of claim 10 wherein the relying party server receives the token of authentication from the client, and accepts the authentication of the client by the identity provider server.

13. The apparatus of claim 10 wherein the identity provider server to authenticate the client without receiving a password associated with a username from the client.

14. The apparatus of claim 10 wherein the identity provider server upon authenticating the client, to receive a profile configuration for the relying party server from the client, the profile configuration including selected user data to be communicated to the relying party server.

15. The apparatus of claim 14 wherein the identity provider server to transmit through the client the selected user data to the relying party server.

16. A non-transitory machine-accessible storage medium including data that, when accessed by a machine, cause the machine to perform a method comprising:
issuing a digital certificate from an identity provider server of a single sign on scheme that is signed by the identity provider server to a client,
authenticating, by the identity provider server, the client redirected from a relying party server of the single sign on scheme by:
requesting the digital certificate issued to the client from the client;
sending a second digital certificate by the identity provider server to the client, wherein the second digital certificate allows the client to authenticate the identity provider server;
receiving the digital certificate from the client;
authenticating the client using the received digital certificate;
and
transmitting a token of authentication to the client by the identity provider server upon authentication of the client.

17. The storage medium of claim 16 wherein the method further comprises generating a key pair, prior to the authenticating the client redirected from the relying party server;
providing a public key of the key pair to the client prior to the authenticating the client redirected from the relying party server, wherein the client encrypts the digital certificate using the public key;
receiving the encrypted digital certificate from the client; and
decrypting the encrypted digital certificate using a private key of the key pair.

18. The storage medium of claim 16 wherein the relying party server receives the token of authentication from the client, and accepts the authentication of the client by the identity provider server.

19. The storage medium of claim 16 wherein authenticating further comprises authenticating the client without receiving a password associated with a username from the client.

20. The storage medium of claim 16 wherein the method further comprises upon authenticating, receiving a profile configuration for the relying party server from the client, the profile configuration including selected user data to be communicated to the relying party server.

21. The storage medium of claim 16 wherein the method further comprises transmitting through the client the selected user data to the to the relying party server.

* * * * *